(12) United States Patent
Gulko et al.

(10) Patent No.: US 9,690,930 B1
(45) Date of Patent: Jun. 27, 2017

(54) DETECTING PERIODICITY IN A STREAM OF EVENTS

(71) Applicant: EMC Corporation, Hopkinton, MA (US)

(72) Inventors: Eugene Gulko, Campbell, CA (US); Andreas Wittenstein, Woodacre, CA (US); Richard Chiles, Castro Valley, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 599 days.

(21) Appl. No.: 14/229,028

(22) Filed: Mar. 28, 2014

Related U.S. Application Data

(60) Provisional application No. 61/937,208, filed on Feb. 7, 2014.

(51) Int. Cl.
*G06F 21/50* (2013.01)
*G06F 17/15* (2006.01)

(52) U.S. Cl.
CPC .............. *G06F 21/50* (2013.01); *G06F 17/15* (2013.01)

(58) Field of Classification Search
None
See application file for complete search history.

(56) References Cited

U.S. PATENT DOCUMENTS

| | | | |
|---|---|---|---|
| 7,610,324 B2 | 10/2009 | Troyansky et al. | |
| 8,509,368 B2 | 8/2013 | Fudge et al. | |
| 8,891,602 B1 | 11/2014 | Giust | |
| 2006/0161361 A1* | 7/2006 | Tabatabaei | G01R 31/31709 702/69 |

\* cited by examiner

*Primary Examiner* — Michael D Yaary
(74) *Attorney, Agent, or Firm* — BainwoodHuang

(57) ABSTRACT

Sequences of discrete events, such as clicks on a website, are evaluated for periodic behavior, a period is calculated, and the sequence is scored to determine the confidence that the sequence really exhibits periodicity. The random variations on the timing of the discrete events due to transmission delays or other factors may be reduced or eliminated from the evaluation. An apparatus for performing the method of evaluation may include a computer programmed to carry out the method.

17 Claims, 5 Drawing Sheets

DETECTING PERIODICITY IN A STREAM OF EVENTS

CROSS REFERENCE TO RELATED APPLICATIONS

This Patent Application is a non-provisional utility application which claims the benefit under 35 U.S.C. 119(e) from U.S. Provisional Patent Application No. 61/937,208 filed on Feb. 7, 2014, entitled, "DETECTING PERIODICITY IN A STREAM OF EVENTS", the contents and teachings of which are hereby incorporated by reference in their entirety.

BACKGROUND

Systems that support online services, such as internet banking, receive many inputs from computer users interacting with an online service. For example, an online banking service that provides a website to account holders may receive many mouse clicks, or web clicks, or key strokes over the course of a single online banking session. Each of the individual clicks or strokes represents a discrete event. There may be a pattern to a sequence of clicks in a single online banking session, and this pattern may reveal information about the source of the clicks. Specifically, a periodic set of clicks may raise concerns that the source of the clicks is a threat, such as a password cracker program.

Conventional online support services detect periodicity in a sequence of clicks by using algorithms that seek out equally spaced clicks via direct measurement, or by other means such as Fourier transforms.

SUMMARY

Unfortunately, there are deficiencies with the above-described conventional online support services. For example, mouse or web clicks are typically received in a noisy environment. Specifically, mouse or web clicks may travel through a noisy network and meet with random delays. Consequently, algorithms that base a determination of periodicity solely on finding equally spaced clicks lack the robustness needed to find periodic behavior in such an environment.

In contrast to the above-described conventional transaction servers that lack robustness in detecting periodic click streams in a noisy environment, an improved technique involves assigning a periodicity score in a click stream that is indicative of the confidence that the click stream forms a periodic sequence. Along these lines, a server forms an autocorrelation function from clicks in a click stream that contains a series of spikes at time differences between the receive times of each click. The server then convolves this autocorrelation with a jitter kernel that is representative of the temporal noise distribution in the network environment in which the clicks were received. From this convolution, the server may make an estimate of a period T of the click stream. From further analysis, the server may then assign a periodicity score indicative of the confidence level that the click stream is periodic with period T.

Advantageously, the improved techniques may be employed to evaluate periodicity in a sequence of discrete events to robustly determine whether there is an attack occurring, whether there has been a change in a specific routine market practice, whether there are patterns in a market activity, or many other situations where the either the presence or absence, or of a change in periodicity of any sequence of discrete events has occurred. With such an arrangement, a sequence of discrete events may be analyzed as to whether or not there is a periodic nature, and a score representing the degree of periodicity may be generated. Knowledge of the periodicity, or lack of periodicity, may be useful in determining the likelihood of an attack being in progress, or for data mining items that may be buried in a noisy data stream. Such a system may provide a more robust determination of periodic threats, or periodic opportunities, than prior art methods. Such an arrangement is more capable of accounting for deviations in periodicity caused by communication variations such as jitter, and thus discovering hidden periodicity.

One embodiment of the improved technique is directed to a method of evaluating a likelihood that a sequence of discrete events displays periodic patterns. The method includes receiving a sequence of discrete events over a time period, for example the clicks made by a client accessing a bank website, and forming a window in time encompassing a temporal extent over which the sequence of discrete events was received. The method may also include generating a first autocorrelation function for the sequence of discrete events. The method may also include generating a convolution of the first autocorrelation function using a jitter kernel to form a smoothed autocorrelation function having a set of peaks. The method may include generating a period value of the first autocorrelation function corresponding to a highest peak in the smoothed autocorrelation function, and generating a likelihood that the sequence of discrete events is periodic based upon the set of peaks.

Other embodiments of the improved techniques are directed to a computer program product which includes a non-transitory computer readable medium storing a set of instructions that, when carried out by a computer, cause the computer to perform the method of evaluating a likelihood that a sequence of discrete events displays periodic patterns.

Another embodiment of the improved techniques is directed to a computing circuit, including a communications interface connected to a network, a memory circuit, a receiving circuit constructed and arranged to evaluate a likelihood that a sequence of discrete events displays periodic patterns.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
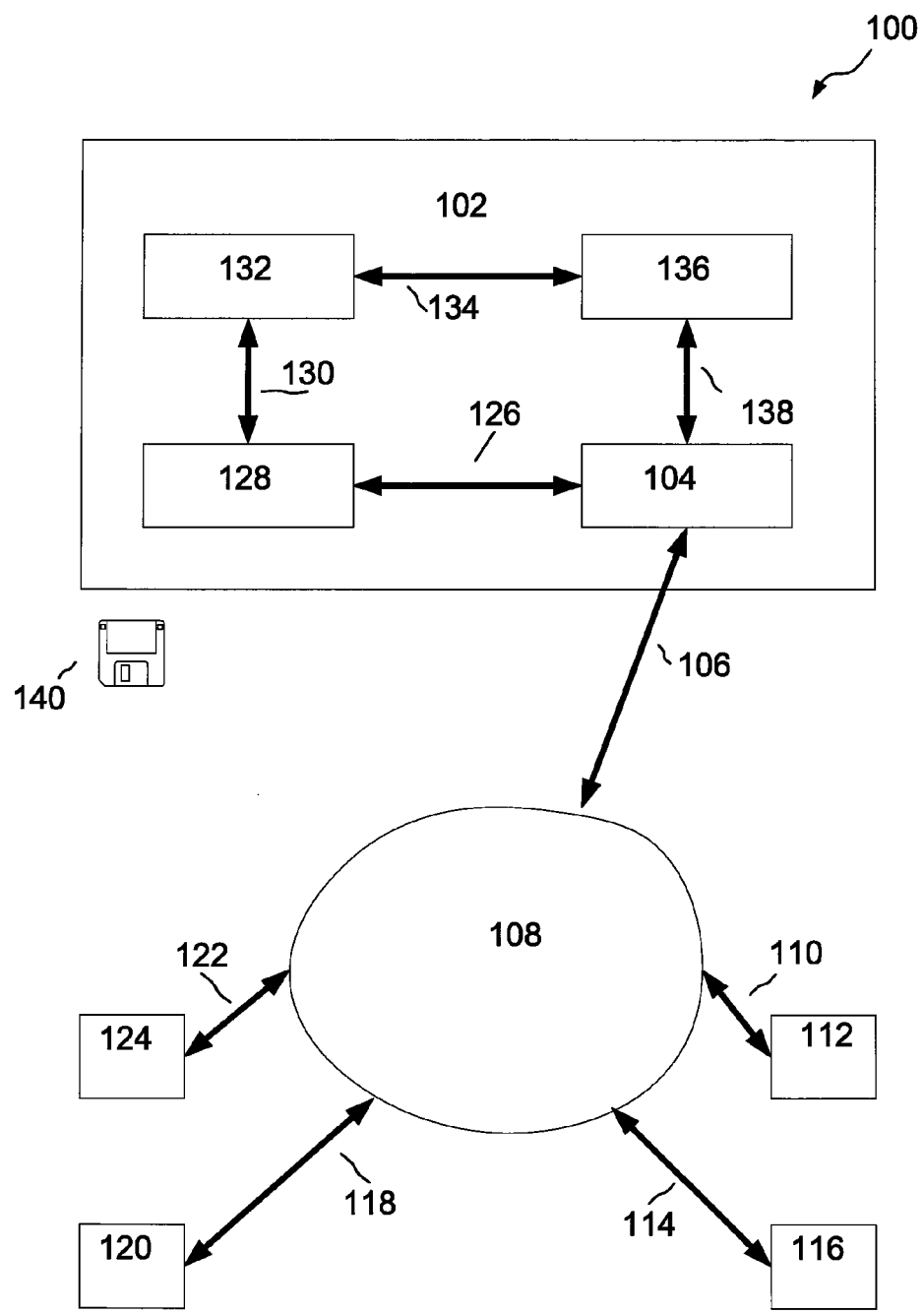
FIG. 1 is a diagram of an electronic apparatus for detecting periodicity.

An improved technique involves assigning a periodicity score in a click stream that is indicative of the confidence that the click stream forms a periodic sequence. Along these lines, a server forms an autocorrelation function from clicks in a click stream that contains a series of spikes at time differences between the receive times of each click. The server then convolves this autocorrelation with a jitter kernel that is representative of the temporal noise distribution in the network environment in which the clicks were received. From this convolution, the server may make an estimate of a period T of the click stream. From further analysis, the server may then assign a periodicity score indicative of the confidence level that the click stream is periodic with period T.

The convolution results in a smoothed autocorrelation function having a set of peaks, which provide an estimated period value for a potential pattern. The period is used to estimate a second jitter kernel for another convolution $R_s'$ and a confidence level.

The method improves evaluation of periodicity for discrete events, such as clicks, and provides a confidence score that indicates the likelihood that a series of events contains a periodic sequence. The discrete events may be characterized by virtue of the events originating from a single internet address, or from a single user, or having some other common feature such as using the same protocol. Thus, a specific discrete event may become part of two or more click streams.

The improved methods may include receiving a sequence of discrete events, such as mouse clicks. The method may include generating an autocorrelation function of the sequence of discrete events, for example fourteen discrete events, where the autocorrelation function may comprise spikes representing pairwise differences in the time received for each individual discrete event. The autocorrelation function may be an arithmetic sum of all the spikes, and spikes that arrive at the measuring location essentially simultaneously may be treated as multiple spikes or as a single spike of proportionally higher strength. In some situations the autocorrelation function may include the differences in time received for a selected portion of all of the spikes received at the measuring location.

The method may include generating a convolution $R_s$ between the autocorrelation function and what a jitter kernel to form a smoothed autocorrelation function having a set of peaks. Jitter kernels may be a probability distribution function for a random variable representing a time delay between discrete events in the sequence of discrete events, and may have any of a variety of shapes such as a monotonic function, a Gaussian, a raised cosine window, a Hamming window, a Hanning window, a top hat, or a $\sin(\omega t)/t$ function. The method may also include generating a period value corresponding to a highest peak in the smoothed autocorrelation function, and generating a likelihood of periodic patterns based upon the set of peaks.

In some arrangements, the shape maybe a Gaussian function having a standard deviation that may be varied as desired to be indicative of the noise environment and to obtain the desired result in smoothing the autocorrelation function. This will produce a smoothed autocorrelation function $R_s$ of the discrete events that may capture slightly delayed clicks, for example due to delays in transmission path, and show them to be part of a periodic pattern. The calculated score may be calculated for each individual peak.

In some arrangements, the method includes calculating a period T using the location of the highest peak and compute a second smoothed autocorrelation function using a second jitter kernel, where the width of the second jitter kernel is scaled using the calculated period T, for example a Gaussian having a standard deviation that is a tenth of the period T. In this case, the method also includes generating a final score over the number of discrete events sampled at multiple times.

Each of the click streams is evaluated to determine a relative degree of confidence that the sequence of discrete events in the stream actually does exhibit periodic behavior. The periodicity is evaluated for each individual discrete event based upon a selected number of clicks leading up to that individual click, and a confidence score is determined. The number of clicks evaluated may be any number, for example the fourteen previous clicks, with the preceding clicks being ignored for the calculation.

The selected number of clicks in an evaluation period may be adjusted to accommodate streams having a large variation in signal travel time, which may be known as jitter. For example, remote access attempts made by a denial of service attack where the network route may vary in length due to changes in network traffic loads would have a certain amount of signal jitter.

The above discussion has focused on examples of the use of periodic behavior for determining the presence of potential security threats, but there are other uses as well. Discrete events of various types may have periodic sequences of signal events, or may occur at periodic times. For example, an employer may run a payroll program at the same time each week, or a vertical password guesser may try a new password guess every ten minutes until success is achieved. Some periodic sequences may be benign, and some may indicate an attack. Even in the case where the periodic activity is benign, deviations from the expected benign periodicity may indicate a problem that may indicate a potential issue that needs additional attention.

The examples presented will be applied to a general case where an online business uses an outside vendor to perform the periodicity analysis. The online business could directly analyze the sequence of discrete events in the same computer that received the discrete events, but the information on the time of arrival of the discrete events may be sent to a central location for reasons such as maintaining the bandwidth of the computer handling the business events, or because a central vendor may have computer equipment with greater data handling capability and provide faster analysis results than may be obtained using the online business computer.

FIG. 1 is a diagram of an electronic apparatus 100 for evaluating a likelihood that a sequence of discrete events displays periodic patterns. The apparatus 100 includes a computing circuit 102 having a receiving circuit 104 for receiving a sequence of discrete events. The receiving circuit 104 is communicatively connected by bidirectional communications means 106 to a network 108. The communications means 106 may be a wired, a wireless, an RF, an IR connection, or any of many other well-known communication means. The network 108 may be the internet, an intranet, the cloud, a token ring, or any of many other well-known networking devices.

The network 108 is communicatively connected to users 112, 116, 120 and 124 by bidirectional communications means 110, 114, 118 and 122 respectively. Users 112, 116, 120 and 124 may represent a bank 112, a credit card agency 116, a retail store 120, a manufacturer 124, or any person or organization that has a website or electronic devices that use streams of discrete events, such as clicks or keystrokes.

Users may employ the network 108 to send information on the discrete event timing to the computing circuit 102. As an example, when a bank 112 website receives clicks from a customer using a remote terminal, the bank may want to know if the received sequence of clicks includes a periodic pattern. The periodicity of the pattern of clicks may be used to determine if the customer is a machine rather than a person. This may be useful in preventing fraud or spoofing.

The sequence of clicks sent to the computing circuit 102 by the user (112, 116, 120, 124) is received by the receiving circuit 104, and transmitted via bidirectional communications means 126 to a memory circuit 128 for storage, and to a controller circuit 132 via bidirectional communication means 130. The sequence of clicks may be an actual recording of the clicks as they were received by the user, or it may be a data file that includes the reception time of each of the individual clicks, or other method of transmitting information concerning the sequence of clicks, including arrival times, signal strength, and whether multiple clicks were received in a single time window. A flowchart of the steps of the operation of the computing circuit 102 is found in FIG. 2, and will be discussed in greater detail below.

The controller 132 transmits the sequence of discrete events via bidirectional communication means 134 to logic circuit 136, and directs logic circuit 136 to calculate an appropriate window in time that will encompass a time period or temporal extent, over which the sequence of discrete events, in this example mouse clicks, was received by the user. A graphical example of the sequence of discrete events as a function of time is found in the upper half of FIG. 3, and will be discussed in greater detail below.

The controller 132 may direct the logic circuit 136 to calculate an autocorrelation function of the sequence of discrete events, the autocorrelation function comprising spikes representing pairwise differences in time received for each individual one of the discrete events in the window in time. An autocorrelation function has a form of $R(t)=\Sigma_{i=1}^{N-1}\Sigma_{j=i+1}^{N} \delta(t, t_j-t_i)$ where N is the number of discrete events, t is the time the clicks occur, and $\delta$ is the Kroneker delta, where $\delta(x,y)=1$, if $x=y$, and zero if not.

A graphical example of the autocorrelation function with respect to differences in arrival time is found in the lower half of FIG. 3, and will be discussed in greater detail below. The autocorrelation function is an arithmetic sum of all of the spikes representing differences in time at which discrete events arrive. In this example the time difference between each of the clicks is shown as being very regular and consequently the autocorrelation is also very regular and shows a clear pattern, however, the describe apparatus is not so limited, and in common situations the arrival time of the discrete events would likely not be so regular due to variations in the electronic pathways that each individual event traverses on the way to the recording location of the user.

The controller 132 may direct the logic circuit 136 to calculate a convolution $R_s$ between the autocorrelation function and an estimated jitter kernel to form a smoothed autocorrelation function having a set of peaks. A graphical example of the autocorrelation function of FIG. 3 including a representation of a jitter kernel is found in the upper half of FIG. 4, and the resulting smoothed autocorrelation function is found in the lower half of FIG. 4.

It should be noted that the shape of the jitter kernel may be any function, and in particular any function that describes a probability distribution function for a random variable between members of the sequence of discrete events. For example, in some arrangements the jitter kernel takes the form of a Gaussian function of time difference t as follows: $K(t)=e^{-t^2/2\sigma^2}/\sqrt{2\pi}\sigma$, where $\sigma$ is the standard deviation. Generally speaking, the jitter kernel may include a width that is indicative of the sort of noise, or travel delays, experienced by the mouse clicks discussed in the given examples. It should be understood that, in performing the convolution of the autocorrelation function with the jitter kernel, logic circuit 136 only considers 4 $\sigma$-wide regions which contain at least three peaks.

Figure 3:
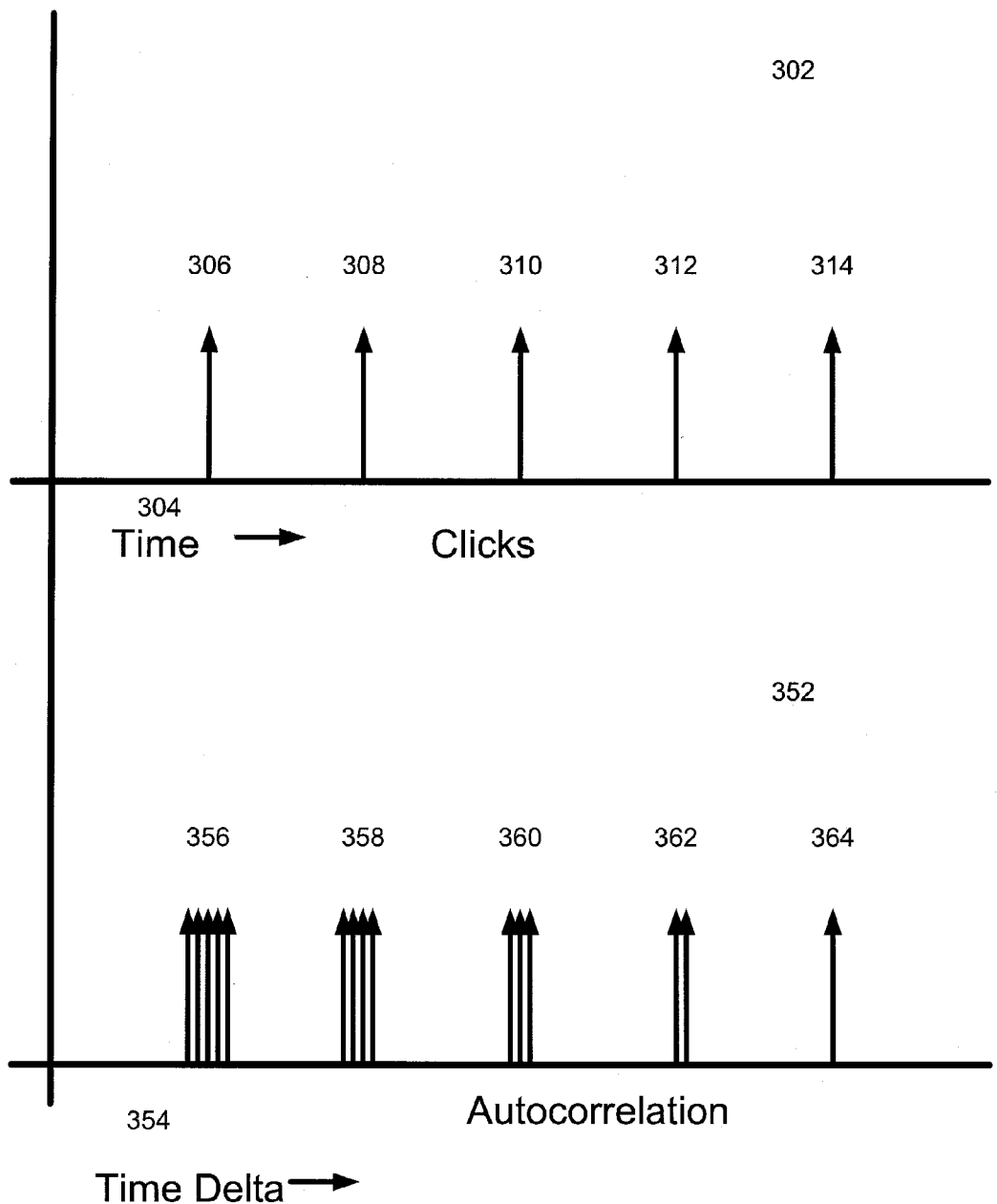
FIG. 3 is a diagram showing the time of arrival of a sequence of clicks and an autocorrelation of the time differences between the arrival times of each of the clicks.
Figure 4:
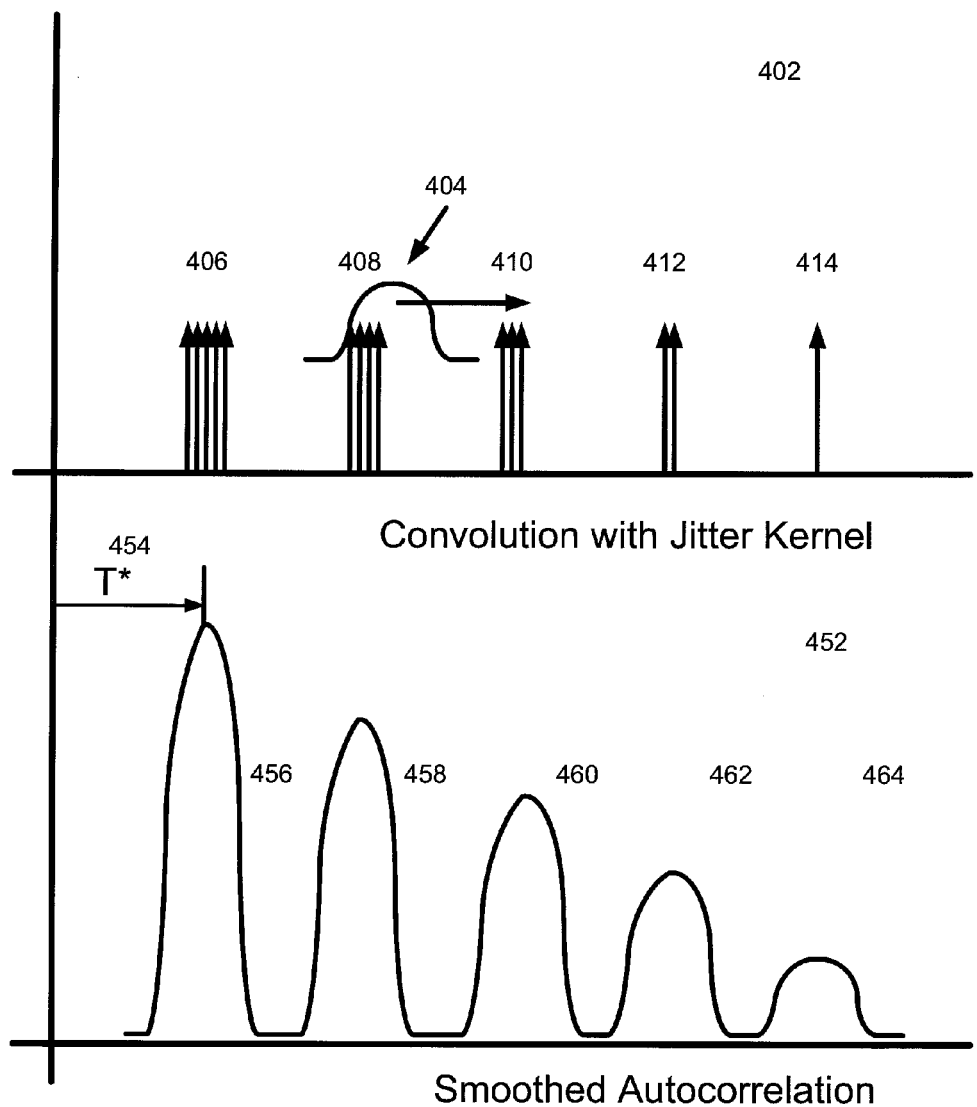
FIG. 4 is a diagram showing a convolution of the autocorrelation with a jitter kernel and the resulting smoothed autocorrelation.

The controller 132 may direct the logic circuit 136 to calculate an estimated period value, for example the value T shown in FIG. 4, using a distance to a highest peak in the smoothed autocorrelation function. The highest peak corresponds to the time difference having the most individual discrete event occurrences, and thus is a valuable initial estimate of a possible periodic value. The logic circuit may now calculate a likelihood that the sequence of discrete events is periodic based upon the set of peaks and their locations. The controller 132 may direct the logic circuit 136 to calculate a second jitter kernel, where a width of the second jitter kernel is selected to be proportional to the period T, as found above and as shown in FIG. 3. As an example calculation, the logic circuit may adjust the width of the initial kernel by a factor of the standard deviation being set to 0.1T, such that the width of the kernel would approximate 40% of the distance between each peak, and thus include spikes having substantial random delays in arrival at the recording location. It should be noted at this point that the second jitter kernel should be more accurate than the initial jitter kernel, which was not based upon the results of the present sequence of discrete events. Thus, the second jitter kernel may be either narrower or wider than the initial jitter kernel, and may result in a smoothed autocorrelation function having either wider or narrower peaks than the first smoothed autocorrelation. The second jitter kernel may be used in a convolution with the autocorrelation function to improve the accuracy of the smoothed autocorrelation.

Figure 5:
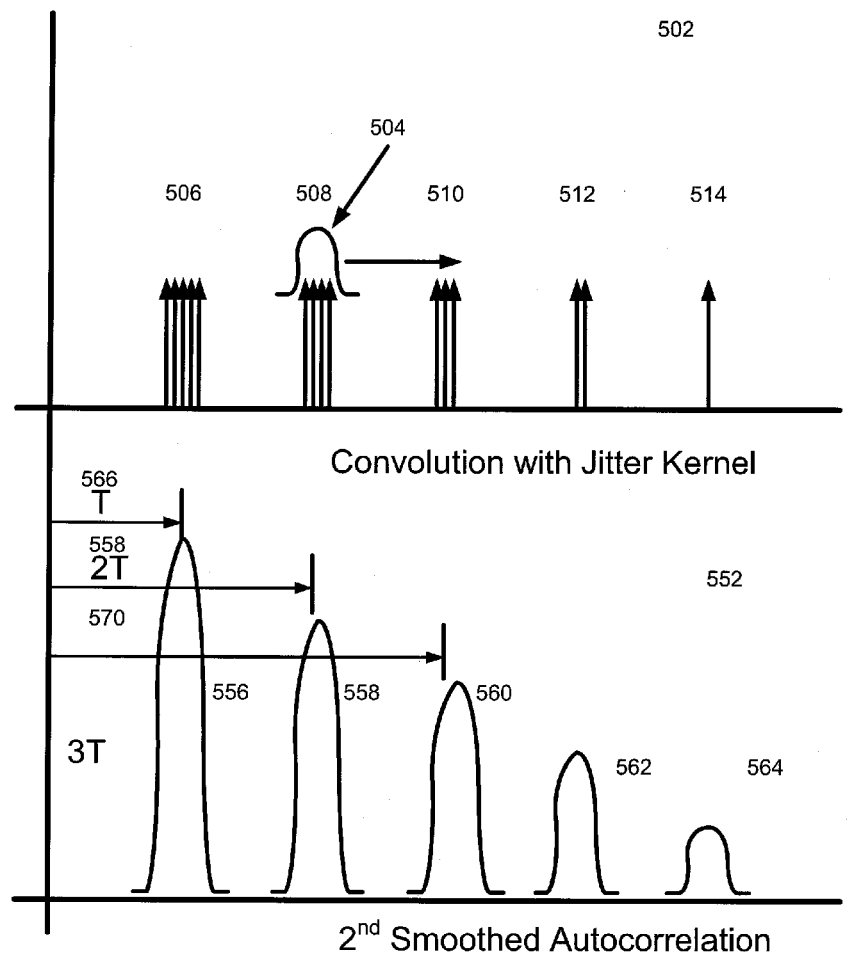
FIG. 5 is a diagram showing a convolution of the autocorrelation with a second jitter kernel and the resulting second smoothed autocorrelation.

The controller 132 may direct the logic circuit 136 to calculate a second convolution between the second jitter kernel and the autocorrelation function to form a second smoothed autocorrelation function, as shown in FIG. 5, where the example shows a Gaussian jitter kernel that is narrower than the first jitter kernel related to the use of the proportionality of the estimated period T for this sequence of discrete events being applied to the width of the jitter kernel.

The controller 132 may direct the logic circuit 136 to calculate a periodicity measure as the sum of the values in the second smoothed autocorrelation evaluated at points T, 2T, 3T, etc. This may be known as the anomaly, or how much the calculated periodicity varies from a perfect period. The anomaly may be represented as an equation, anomaly=$\Sigma_n R_s'(nT)$.

To generate a final score the anomaly value may be normalized by dividing by the number of spike timing differences used in the calculation. In the case of N spikes the normalization factor would equal (N(N−1))/2 if every possible time of arrival difference were to be included. In addition, it may be desirable to convert the normalized anomaly to a final score form more easily understood by users, by setting the final score to be equal to (1−(1−normalized anomaly))×(100) which provides a simple percentage value for use in evaluating whether or not a sequence of discrete events, such as clicks, has a periodic pattern.

In an apparatus 100, in order to enable what may be known as real time analysis of a sequence of discrete events for periodicity, considerations of the maximum computing speed available in computing circuit 102 may limit the number of discrete events or spikes that may be examined. This is because the number of pairwise time differences that need to be examined, and which enter into the calculation, increases as (N(N−1))/2 as the number of spikes increases. The memory requirements of memory 128 also increase, as well as other limitations of all of the entities shown in FIG. 1, for example bandwidth in the network 108. In view of these limitations, the number of discrete events or spikes allowed in a window of time may beneficially be limited to a constant value, for example 14 discrete events. In such a case, each new event could be added to the window, and an oldest event could be removed, to provide a rolling calculation of periodic patterns in real time.

A computer program product which includes a non-transitory computer readable medium storing a set of computer instructions to perform the above described calculations and operations in a computerized device, may include a computer disk, such as disk 140 of FIG. 1, which may be used to load instructions to a memory location, such as memory 128 of the computing circuit 102. Many other well-known methods of providing computer instructions to a computing circuit may also be used.

Figure 2:
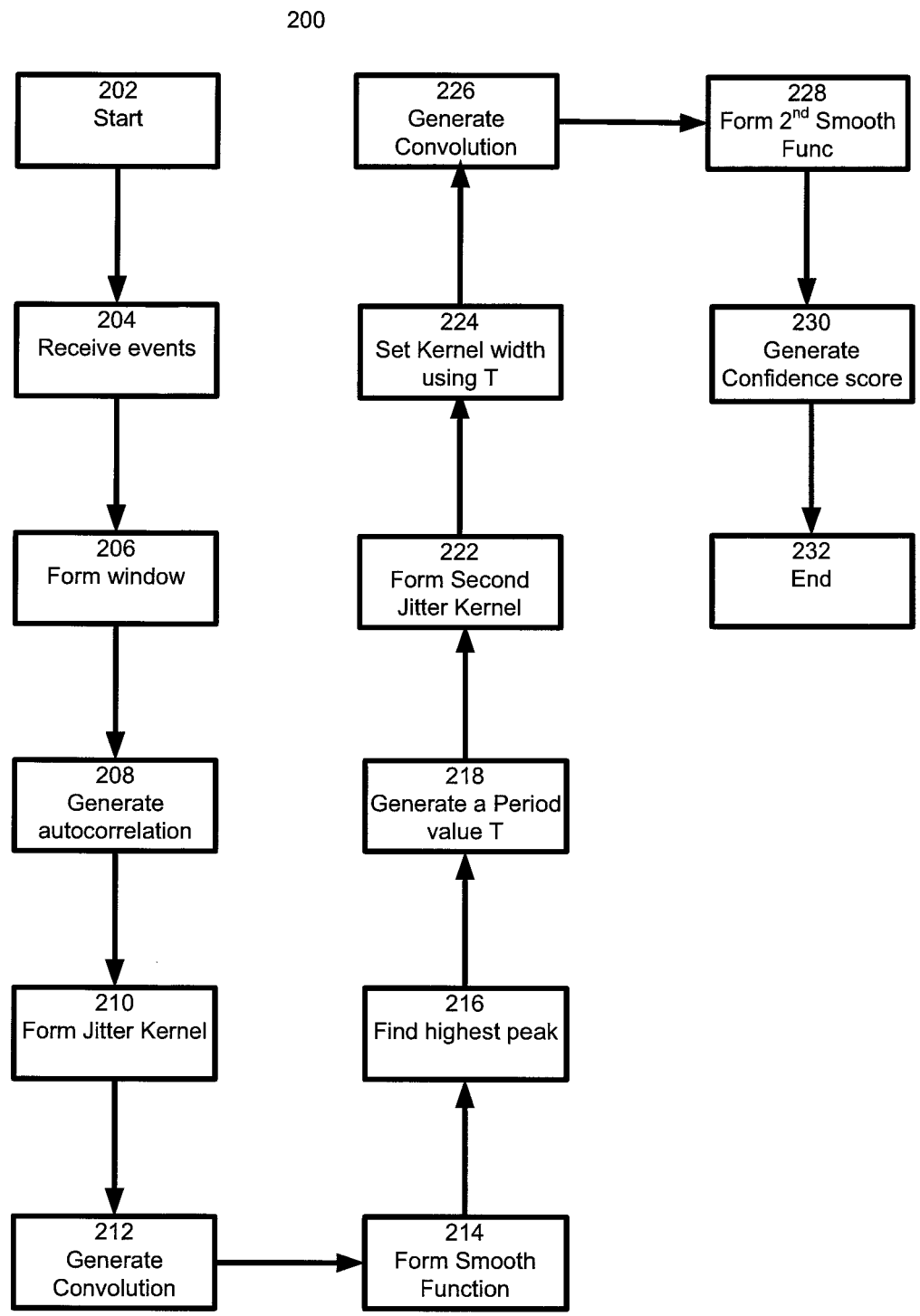
FIG. 2 is a flowchart of steps in a method for detecting periodicity.

A method for calculating and providing the steps of evaluating a sequence of discrete events for a likelihood of periodic patterns will now be discussed with reference to FIG. 2. FIG. 2 is a flowchart of steps in a method 200 for detecting periodicity and providing a confidence score that the detected periodic pattern is correct.

The method begins at step 202 and the computing circuit 102 receives the sequence of discrete events to be analyzed at step 204 at the receiving circuit 104. The sequence is examined by the logic circuit 136 under the control of the controller 132 and an appropriate window in time which contains a selected number of discrete events, for example 14 computer mouse or web clicks, is created at step 206.

At step 208 the logic circuit 136 generates an autocorrelation function of the sequence of discrete events, and forms a jitter kernel at step 210, which may represent an estimation of a width of a distribution of random events occurring in the arrival of each of the discrete events, and affecting the timing of the arrival. At step 212 the logic circuit 136 generates a convolution between the initial jitter kernel and the autocorrelation function, and forms a first smoothed autocorrelation function at step 214.

At step 216 the logic circuit 136 finds a highest peak in the first smoothed autocorrelation function and generates a period value T at step 218. A level of confidence may be obtained by the logic circuit 136 forming a second jitter kernel at step 222, where the second kernel is formed with a shape that is calculated to better fit the sequence of discrete events than the first jitter kernel, which was estimated from known average variations. The second jitter kernel may be narrower or wider than the first.

At step 224 the logic circuit 136 sets the second kernel width using the value T generated at step 218 to further refine the relationship of the width of the jitter kernel to the specific sequence of discrete events being examined. For example, the second jitter kernel may be formed having a standard deviation proportional to one tenth of the period T, and maybe determined to allow maximum arrival variation without missing an event.

At step 224 the logic circuit 136 generates a second convolution using the second jitter kernel and the autocorrelation function. The convolution results in a second smoothed autocorrelation function $R_s'$ at step 228, and the generation of a confidence score that provides the likelihood that the found periodic pattern with period T is actually a periodic function at step 230. The level of confidence may be obtained by examining how closely the various multiples of the period T match with the actual peaks of the smoothed autocorrelation function. The method of detecting periodicity in a stream of discrete events ends at step 232.

FIG. 3 is a diagram showing the time of arrival of a sequence of clicks and an autocorrelation of the time differences between the arrival times of each of the clicks. An upper portion 302 of the graph shows a horizontal time axis 304 with five illustrated clicks 306, 308, 310, 312 and 314. Each of the clicks is shown as having arrived at a different time, and the time difference between the arrival times are shown as being equal, but the method and apparatus are not limited to regularly spaced arrival times, and normal random statistical variations are expected in real world situations. These normal variations are what the present arrangement is designed to measure and to determine if an actual periodicity exists in the sequence of discrete events, such as the clicks shown, or whether the sequence is simply random.

A lower portion 352 of the graph shows a horizontal time delta axis 354 the results of an autocorrelation function performed with the spikes 306-314, and resulting in groups of spikes 356, 358, 360, 362 and 364. The autocorrelation represents every pairwise combination of differences in arrival times for the spikes 306-314. The example shows that the evenly spaced spikes 306-314 of the upper portion 302 of the graph result in an autocorrelation where the time differences are very bunched up and reflect a strong periodicity, but the normal real world result would likely be much less periodic and chaotic due to random time delays.

FIG. 4 is a diagram showing a convolution of the autocorrelation of FIG. 3 with a jitter kernel and the resulting smoothed autocorrelation. The graph includes an upper portion 402 with a jitter kernel 404 convolved with the five shown groups of spikes 406, 408, 410, 412 and 414. The jitter kernel is shown as being a Gaussian function, but different window functions, such as raised cosine, Hamming, Hanning, or sin(ωt)/t, may be used as appropriate for the type of sequence of discrete events being evaluated. The jitter kernel will have a horizontal width measure, for example a standard deviation for a Gaussian function as shown, that may be selected to reflect the normal variations found in the environment of the discrete events.

A lower portion 452 of the graph shows the result of the convolution of the jitter kernel 404 with an autocorrelation function, resulting in a smoothed autocorrelation function having peaks 456, 458, 460, 462 and 464. The time 454 between a start and a peak of the largest individual peak, in this example 456, is labeled T* and may be used as an estimate of a period of the potential periodic pattern.

FIG. 5 is a diagram showing a convolution of the autocorrelation with a second jitter kernel and the resulting second smoothed autocorrelation. The graph includes an upper portion 502 illustrating a second jitter kernel 504 convolved with the five shown groups of spikes 506, 508, 510, 512 and 514. The jitter kernel is again illustrated as being a Gaussian function, but has a different horizontal width as compared to the jitter kernel 404 of FIG. 4, because jitter kernel 504 has been adjusted by a proportionality based in part upon the value T* found in FIG. 4. For example, a Gaussian jitter kernel as shown may be selected to have a standard deviation of one tenth of T*. The second jitter kernel will have a horizontal width that may be greater or less than that of the first jitter kernel, but may be selected to better represent the actual variations found in the sequence of discrete events being examined for periodicity as compared to the first jitter kernel. In the example, the Gaussian second jitter kernel is shown as having a narrower horizontal width that the first jitter kernel, which may result in narrower autocorrelation peaks.

A lower portion 552 of the graph shows the result of the convolution of the jitter kernel 504 with an autocorrelation function, resulting in a smoothed autocorrelation function ($R_s'$) having peaks 556, 558, 560, 562 and 564. The time 566 between a start and a peak of the largest individual peak, in this example peak 556, is labeled T, while the time 558 between the start and a second highest peak 558 is labeled T2, and the time 570 to the third peak 560 is labeled T3. As many peaks as desired may be used in determining the elapsed time to various peaks of the second smoothed autocorrelation function.

The values T, 2T, 2T and etc. may be compared with each other to determine if the value T to the first peak is close to a peak at the value of 2T, and close to a peak at the third value of 3T. Mathematical methods to determine if the measured times to each peak represent multiples of a single period, and to evaluate the probability that the determined period is actually a periodic pattern or not may be used. A confidence measure of the probability of periodicity may be computed as the sum of the points of $R_s'$ evaluated at the period T, at twice the period 2T, at three times the period 3T, and etc.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to controller 132, which is constructed and arranged to evaluate a likelihood that a sequence of discrete events displays periodic patterns. Some embodiments are directed to a process of evaluating a likelihood that a sequence of discrete events displays periodic patterns. Also, some embodiments are directed to a computer program product which enables computer logic to cause a computer to evaluate a likelihood that a sequence of discrete events displays periodic patterns.

In some arrangements, controller 132 is implemented by a set of processors or other types of control/processing circuitry running software. In such arrangements, the software instructions can be delivered, within controller 132, either in the form of a computer program product 140 (see FIG. 1) or simply instructions on disk or in pre-loaded in memory circuit 128, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of evaluating a likelihood that a sequence of discrete events displays periodic patterns, comprising:
   receiving a sequence of discrete events, wherein the sequence of discrete events includes N discrete events, and wherein the sequence of discrete events comprises a stream of mouse clicks received from a remote terminal;
   forming a window in time encompassing a temporal extent over which the sequence of discrete events was received;
   generating an autocorrelation function of the sequence of discrete events, the autocorrelation function comprising spikes representing pairwise differences in time received for each individual one of the discrete events in the window in time;
   generating a convolution between the autocorrelation function and a jitter kernel to form a smoothed autocorrelation function having a set of peaks;
   generating a period value corresponding to a highest peak in the smoothed autocorrelation function;
   generating a likelihood that the sequence of discrete events is periodic based upon the set of peaks;
   generating a period T based on a location of a largest peak of the set of peaks; and
   generating a score representing a confidence level that there is a sequence of periodic discrete events having the period T, the score being generated for the next individual discrete event received after the N discrete events, including the last N−1 discrete events of the window in time.

2. The method of claim 1, wherein generating the convolution includes generating, as the jitter kernel, a probability distribution function for a random variable representing a time delay between discrete events in the sequence of discrete events.

3. The method of claim 2, wherein generating the probability distribution function includes assigning, to the jitter kernel, a width indicative of noise processes in an environment in which the discrete events occur.

4. The method of claim 2, wherein generating the jitter kernel includes generating a function including a Gaussian function.

5. The method of claim 1, wherein generating the autocorrelation function includes forming a linear combination of spikes at each of all possible pairwise time delays between the discrete events.

6. The method of claim 1 wherein generating the convolution includes creating as the smoothed autocorrelation function including peaks at time delays between discrete events in the window in time.

7. The method of claim 1, wherein:
   forming the window in time includes estimating a first period; and
   forming the jitter kernel further includes determining a normal distribution of random variations in time of arrival of the discrete event as a measuring location, the jitter kernel having a shape with a finite an area above the time axis.

8. The method of claim 1, wherein generating the score representing the confidence level includes dividing an area under each of the peaks by a total of the number of pairwise time differences in time received to form a normalized anomaly.

9. The method of claim 8, wherein the total of the number of pairwise time differences is N(N−1)/2.

10. The method of claim 8, wherein generating the score representing a confidence level that there is a sequence of periodic discrete events includes multiplying the normalized anomaly by a monotonically increasing function.

11. The method of claim 10, further including the normalized anomaly by a value equal to (1−(1−normalized anomaly)$^2$)×(100).

12. A method of evaluating a likelihood that a sequence of discrete events displays periodic patterns, comprising:
   receiving a sequence of discrete events, wherein the sequence of discrete events comprises a stream of mouse clicks received from a remote terminal;

forming a window in time encompassing a temporal extent over which the sequence of discrete events was received;
generating an autocorrelation function of the sequence of discrete events, the autocorrelation function comprising spikes representing pairwise differences in time received for each individual one of the discrete events in the window in time;
generating a convolution between the autocorrelation function and a jitter kernel to form a smoothed autocorrelation function having a set of peaks;
generating a period value corresponding to a highest peak in the smoothed autocorrelation function;
generating a likelihood that the sequence of discrete events is periodic based upon the set of peaks;
generating a period T based on a location of a largest peak of the set of peaks;
forming a second jitter kernel, a width of the second jitter kernel being proportional to the period T;
generating a second convolution between the autocorrelation function and the second jitter kernel to form a second smoothed autocorrelation function; and
generating, from the second smoothed autocorrelation function, a score representing a confidence level that the sequence of discrete events displays periodic patterns.

13. A computer program product which includes a non-transitory computer readable medium storing a set of instructions that, when carried out by a computer, cause the computer to perform a method, comprising:
receiving a sequence of discrete events, wherein the sequence of discrete events includes N discrete events, and wherein the sequence of discrete events comprises a stream of mouse clicks received from a remote terminal;
forming a window in time encompassing a temporal extent over which the sequence of discrete events was received;
generating an autocorrelation function of the sequence of discrete events, the autocorrelation function comprising spikes representing pairwise differences in time received for each individual one of the discrete events in the window in time;
generating a convolution between the autocorrelation function and a jitter kernel to form a smoothed autocorrelation function having a set of peaks;
generating a period value corresponding to a highest peak in the smoothed autocorrelation function;
generating a likelihood that the sequence of discrete events is periodic based upon the set of peaks;
generating a period T based on a location of a largest peak of the set of peaks; and
generating a score representing a confidence level that there is a sequence of periodic discrete events having the period T, the score being generated for the next individual discrete event received after the N discrete events, including the last N−1 discrete events of the window in time.

14. The computer program product of claim 13, wherein generating the convolution includes generating, as the jitter kernel, a probability distribution function for a random variable representing a time delay between discrete events in the sequence of discrete events, where the jitter kernel includes a width indicative of noise processes in an environment in which the discrete events occur; and
wherein generating the autocorrelation function includes forming a linear combination of spikes at each of all possible pairwise time delays between the discrete events.

15. A computing circuit, comprising:
a communications interface connected to a network;
a memory circuit;
a receiving circuit which receives a sequence of discrete events and records a time received of each discrete event in the memory circuit, wherein the sequence of discrete events includes N discrete events, and wherein the sequence of discrete events comprises a stream of mouse clicks received from a remote terminal;
a controller circuit coupled to the communication interface and the memory, wherein the controller circuit:
forms a window in time during which the sequence of discrete events was received;
generates an autocorrelation function of the sequence of discrete events, the autocorrelation function comprising spikes representing pairwise differences in time received for each individual one of the discrete events in the window in time;
generates a convolution between the autocorrelation function and a jitter kernel to form a smoothed autocorrelation function having a set of peaks;
generates a period value corresponding to a highest peak in the smoothed autocorrelation function;
generates a likelihood that the sequence of discrete events is periodic based upon the set of peaks;
generating a period T based on a location of a largest peak of the set of peaks; and
generating a score representing a confidence level that there is a sequence of periodic discrete events having the period T, the score being generated for the next individual discrete event received after the N discrete events, including the last N−1 discrete events of the window in time.

16. The computing circuit of claim 15, wherein further:
wherein the controller circuit generates the convolution to include, as the jitter kernel, a probability distribution function for a random variable representing a time delay between discrete events in the sequence of discrete events, where the jitter kernel includes a width indicative of noise processes in an environment in which the discrete events occur; and
the controller circuit generates the autocorrelation function to include a linear combination of spikes at each of all possible pairwise time delays between the discrete events.

17. The method of claim 1, wherein receiving the stream of mouse clicks from the remote terminal includes receiving the stream of mouse clicks by a receiving circuit through a bidirectional communications means communicably connected to a communication network; and
wherein the communication network is located between the receiving circuit and the remote terminal.

* * * * *